Figure 1:
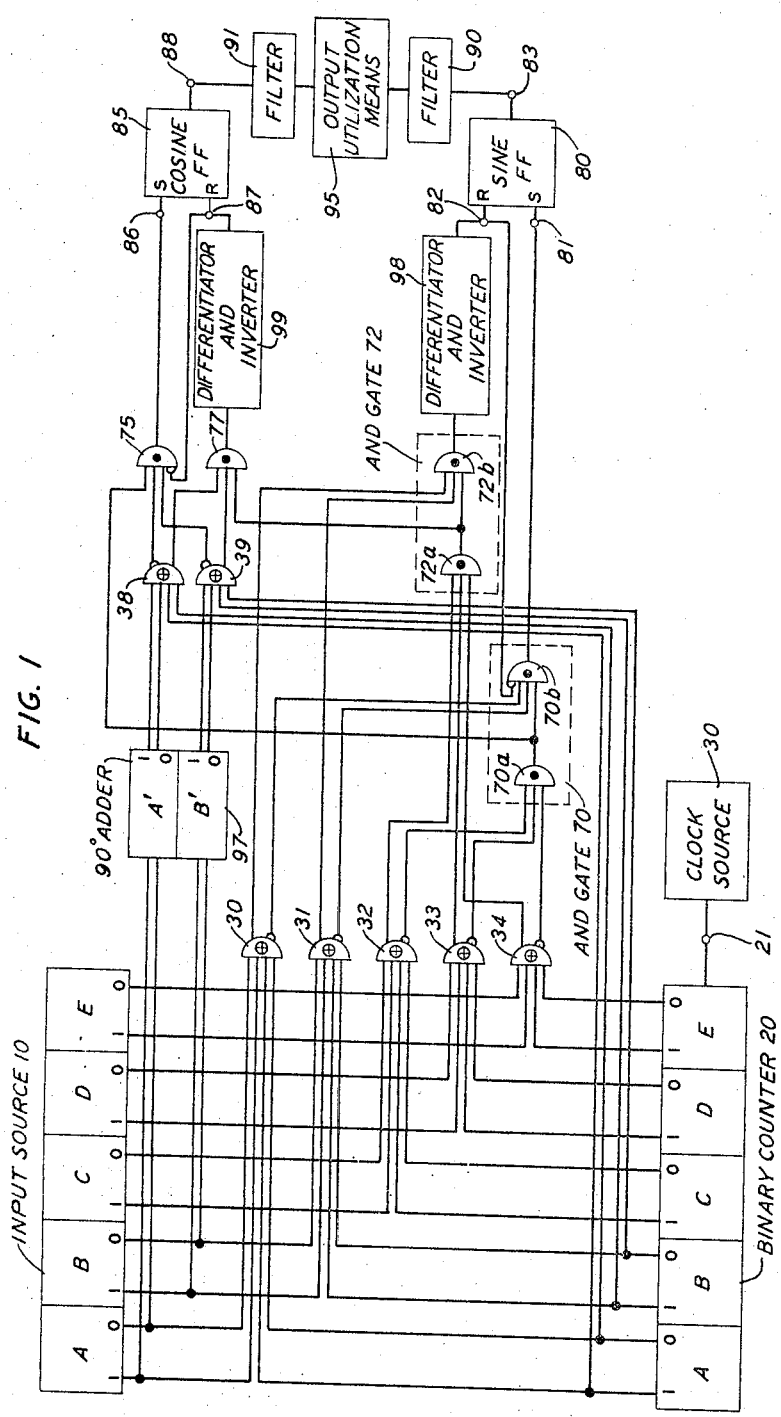

INVENTORS W. T. HARTWELL
R. KLAHN
H. R. SHAFFER

United States Patent Office

3,349,230
Patented Oct. 24, 1967

3,349,230
TRIGONOMETRIC FUNCTION GENERATOR
Walter T. Hartwell, Wharton, Richard Klahn, Morris Plains, and Harold R. Shaffer, Dover, N.J., assignors to Bell Telephone Laboratories, Incorporated, New York, N.Y., a corporation of New York
Filed Dec. 24, 1963, Ser. No. 333,025
18 Claims. (Cl. 235—154)

This invention relates to information translation and, more specifically, to a circuit arrangement for converting data representative of an input angle into constant frequency alternating current signals characterized by amplitudes proportional to the sine and cosine of the input angle.

Alternating current signals of the aforementioned type are widely employed in present-day electronic and electromechanical systems. For example, these potentials may advantageously be utilized in conjunction with an electromechanical resolver to position an antenna or other shaft, and may also be directly employed in an analog computer to develop the respective trigonometric functions.

Prior art arrangements for developing oscillating potentials having an amplitude proportional to sinusoidal functions have employed feedback systems which include an electromechanical element, such as a synchro or a resolver. By applying an alternating current voltage to one synchro (or resolver) winding, the desired sinusoidal signals characterized by sine and cosine amplitude variations are induced in two additional, orthogonal synchro (or resolver) output windings. However, the electromechanical element included in prior art arrangements severely limits the operative speeds thereof. In addition, where the above-defined output signals generated by prior art embodiments are utilized in a second, series-connected feedback loop, as is generally the case with respect to shaft positioning, stability and accuracy problems inherently present in multiple loop feedback systems arise.

It is therefore an object of the present invention to provide an improved information translating arrangement.

More specifically, an object of the present invention is the provision of a circuit arrangement for converting angular information into constant frequency alternating-current signals characterized by maximum amplitudes proportional to the sine and cosine of the input angle.

Another object of the present invention is the provision of a trigonometric function-generating arrangement operative at relatively high speeds, and which is highly reliable.

Still another object of the present invention is the provision of a trigonometric function generator which may advantageously be characterized by any desired degree of accuracy.

These and other objects of the present invention are realized in a specific, illustrative circuit arrangement which converts input angular information in digital form into constant frequency alternating current signals having maximum amplitudes proportional to the sine and cosine of the input angle. The converter portion for generating each of the sine and cosine functions includes coincidences and anti-coincidence logic arrangements to compare the input angle digital information with the state of a linearly time-varying binary counter. The two logic circuit output signals are supplied to the set and reset input terminals of a flip-flop, with the resulting flip-flop output wave shape comprising pulse-width-modulated signals symmetrically displaced about periodically recurring reference times.

The flip-flop output potential is passed through a low-pass or bandpass filter which transmits only the fundamental frequency sinusoid therethrough. A Fourier analysis shows that this sinusoidal signal is characterized by an amplitude proportional to the corresponding trigonometric function of the input angle.

It is thus a feature of the present invention that a trigonometric function generator comprises exclusively electronic, and not electromechanical, circuit elements.

It is another feature of the present invention that a trigonometric function generator comprises a binary counter which varies with time in a linear manner, a source of angular input information, logic elements for detecting a coincidence and an anti-coincidence between the representations of the input source and the counter, a flip-flop set to first and second stable states when the logic elements respectively detect a coincidence and an anti-coincidence between the input source and the counter, the flip-flop thereby producing a symmetrical pulse-width-modulated output potential, and a filter connected to the flip-flop for transmitting therethrough only the fundamental frequency sinusoid included in the flip-flop output potential.

Figure 2:
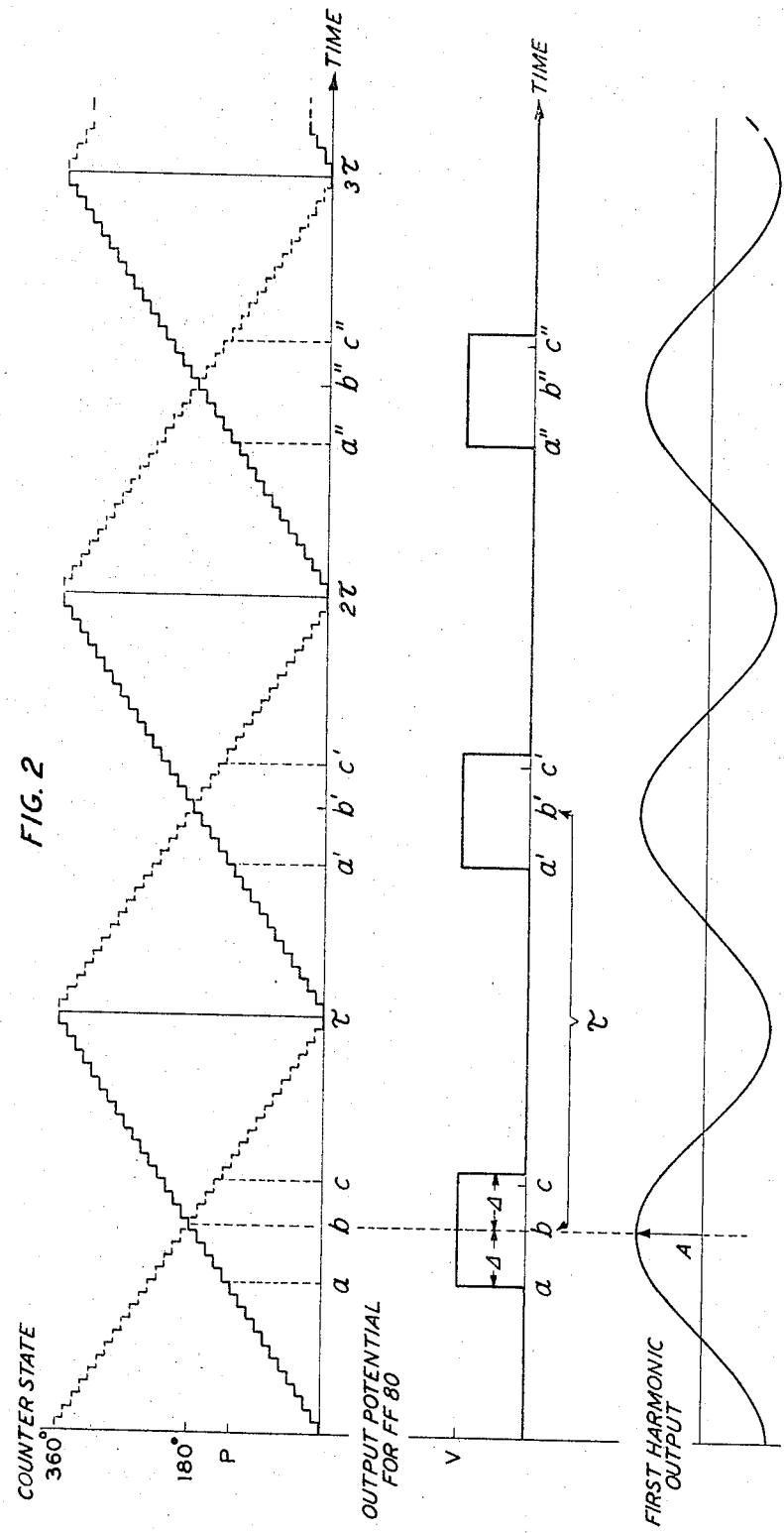

A complete understanding of the present invention and of the above and other features, advantages and variations thereof, may be gained from a consideration of the following detailed description of an illustrative embodiment thereof presented hereinbelow in conjunction with the accompanying drawing, in which:

FIG. 1 is a schematic diagram of an illustrative trigonometric function generator which embodies the principles of the present invention; and FIG. 2 is a timing diagram illustrating the operative conditions for selected circuit elements illustrated in FIG. 1.

Referring now to FIG. 1, there is shown a specific illustrative circuit arrangement which converts input angular information in digital form into constant frequency alternating-current signals characterized by maximum amplitudes proportional to the sine and cosine of the input angle. The arrangement includes a five-stage binary counter 20 and an input source 10 of digital information also comprising five stages. The stages of the source 10 and counter 20 are designated A through E, respectively, with these stages being weighted to represent 180°, 90°, 45°, 22.5° and 11.25°, in that order. Hence, a complete 360° arc is thereby quantized into integral multiples of 11.25°.

The counter 20 includes an input terminal 21 which is supplied by a clock source 30 with a continuous array of regularly-recurring clock pulses. The clock source 30 sequentially translates the five-stage counter 20 through its 32 ($2^5$) stable states. The "1" and "0" output terminals included in corresponding stages A through E of the counter 20 and input source 10 are respectively connected to the input terminals of a different one of five Exclusive OR logic gates 30 through 34. The gates 30 through 34 each further include an inhibited and an unihibited output terminal, with the former terminal being designated by a semi-circle in FIG. 1. It is noted that the Exclusive OR logic function developed at the uninhibited output terminal of each of the gates 30 through 34, for two input variables X and Y, is $XY'+X'Y$, that is, either X or Y, but not both. Further, the inhibited Exclusive OR function for these variables X and Y is $XY+X'Y'$, that is, both X and Y, or neither X and Y. Illustratively, an inhibited output terminal is energized to a relatively high voltage condition when there is a coincidence between the respective signals supplied thereto by corresponding stages of the counter 20 and source 10, while an energized uninhibited output terminal signifies an anti-coincidence between the supplied input signals.

The inhibited output terminals of the gates 32 through 34 are connected to the input terminals of an AND logic gate 70a, with the output signal from this gate being supplied, along with the inhibited output signals from the Exclusive OR gates 30 and 31, to the input terminals of a second AND gate 70b. The reason for dividing a composite AND gate 70 into the two portions 70a and 70b will become more apparent from the discussion hereinafter. Briefly, the purpose is to make the logic function present at the output terminal of the AND gate 70a available for utilization in generating both the sine and cosine amplitude-varying output sinusoids.

Similarly, the uninhibited output terminals of the Exclusive OR gates 32 through 34 are joined with the input terminals of an AND gate 72a, with the output signals from this gate being supplied, along with the uninhibited output signals from the gates 30 and 31, to the input terminals of an AND gate 72b.

The output signal derived from the AND gate 70b is directly supplied to a set input terminal 81 included on a flip-flop 80 which is designated the "sine" flip-flop, with the output signal from the AND gate 72b being supplied to a reset flip-flop input terminal 82 via a differentiating and inverting circuit 98. A bandpass filter 90 connects the output terminal 83 of the sine flip-flop 80 with an output utilization means 95. Further, the output of the differentiator and inverter 98 is connected to an inhibited input terminal on the AND gate 70b.

For purposes of generating the cosine output sinusoid, the FIG. 1 arrangement includes a 90° adder 97, more fully described hereinafter, which has four inputs thereof connected to the two most significant weighted stages A and B of the input source 10. The output terminals of the adder 97 are connected to two input terminals included in each of two Exclusive OR logic gates 38 and 39, with two additional input terminals of the gates 38 and 39 being respectively connected to the A and B stages of the binary counter 20. Each of the gates 38 and 39 also includes an uninhibited output terminal which is connected to an input terminal of an AND gate 77. Each of the gates 38 and 39 further comprise an inhibited output terminal connected to an input terminal of an AND gate 75.

The gates 75 and 77 also comprise additional input terminals respectively connected to the output terminals of the AND gates 70a and 72a, and further include output terminals respectively connected to the set and reset input terminals 86 and 87 of a flip-flop 85 which is designated the "cosine" flip-flop. It is noted that the connection between the AND gate 77 and the reset terminal 87 serially includes a differentiating and inverting circuit 99. An output terminal 88 of the cosine flip-flop 85 is connected via a bandpass filter 91 to the output utilization means 95. Also, the output from the element 99 is supplied to an inhibited input terminal on the AND gate 75. The connections between the elements 98 and 99, and the gates 70b and 75, are employed solely to prevent race conditions wherein both a flip-flop set and reset terminal would be coincidently energized.

As noted hereinabove, the input angle source 10 and the binary counter 20 each comprise five digital stages to quantize the full 360 circular degrees into 32 equal segments of 11.25°, as illustrated by Table I following:

TABLE I

| Angle | Digital Representation | | | | | Angle | Digital Representation | | | | |
|---|---|---|---|---|---|---|---|---|---|---|---|
| | A | B | C | D | E | | A | B | C | D | E |
| 0 | 0 | 0 | 0 | 0 | 0 | 348.75 | 1 | 1 | 1 | 1 | 1 |
| 11.25 | 0 | 0 | 0 | 0 | 1 | 337.5 | 1 | 1 | 1 | 1 | 0 |
| 22.5 | 0 | 0 | 0 | 1 | 0 | 326.25 | 1 | 1 | 1 | 0 | 1 |
| 33.75 | 0 | 0 | 0 | 1 | 1 | 315 | 1 | 1 | 1 | 0 | 0 |
| 45 | 0 | 0 | 1 | 0 | 0 | 303.75 | 1 | 1 | 0 | 1 | 1 |
| 56.25 | 0 | 0 | 1 | 0 | 1 | 292.5 | 1 | 1 | 0 | 1 | 0 |
| 67.5 | 0 | 0 | 1 | 1 | 0 | 281.25 | 1 | 1 | 0 | 0 | 1 |
| 78.75 | 0 | 0 | 1 | 1 | 1 | 270 | 1 | 1 | 0 | 0 | 0 |
| 90 | 0 | 1 | 0 | 0 | 0 | 258.75 | 1 | 0 | 1 | 1 | 1 |
| 101.25 | 0 | 1 | 0 | 0 | 1 | 247.5 | 1 | 0 | 1 | 1 | 0 |
| 112.5 | 0 | 1 | 0 | 1 | 0 | 236.25 | 1 | 0 | 1 | 0 | 1 |
| 123.75 | 0 | 1 | 0 | 1 | 1 | 225 | 1 | 0 | 1 | 0 | 0 |
| 135 | 0 | 1 | 1 | 0 | 0 | 213.75 | 1 | 0 | 0 | 1 | 1 |
| 146.25 | 0 | 1 | 1 | 0 | 1 | 202.5 | 1 | 0 | 0 | 1 | 0 |
| 157.5 | 0 | 1 | 1 | 1 | 0 | 191.25 | 1 | 0 | 0 | 0 | 1 |
| 168.75 | 0 | 1 | 1 | 1 | 1 | 180 | 1 | 0 | 0 | 0 | 0 |

The table is divided with the first sixteen angles, viz., from 0° through 168.75°, successively increasing in magnitude in the left half of the table, and with the sixteen highest angles, viz., from 180° through 348.75°, being included in the right half of the table with the lowest value on the bottom of the column. Table I was so arranged to point out the symmetry of the binary digital representations (straight binary code) for the angles about the sixteenth and seventeenth entries, that is, 168.75° and 180° on the bottom of Table I. Note that for any two entries which are equi-distant from the bottom of the table, each of the digits A through E included in the angle under 180° is exactly opposite to the corresponding digit included in the angle above 180°. As will become apparent from the discussion hereinafter, the FIG. 1 embodiment utilizes the above-noted symmetry.

With the above-described organization in mind, an illustrative sequence of the circuit operation for the FIG. 1 trigonometric function-generating embodiment will now be described. First, the FIG. 1 arrangement will be shown to convert the input angular information supplied by the source 10 into a sinusoid having a maximum amplitude characterized by the sine of the input angle. The cosine portion of the FIG. 1 embodiment, which will be discussed hereinafter, is essentially similar thereto, simply employing the trigonometric identity $\cos \theta = \sin(\theta + 90°)$.

Assume now that the sine flip-flop 80 is reset, and that the input stages A through E included in the input source 10 supply the binary word 01010. As a result, the "0" terminals of the stages A, C and E, and the "1" terminals of the stages B and D are energized to a relatively high voltage state. As may be observed from Table I supra, this particular binary word corresponds to an input angle of 112.5°. This angle is identified by a point P on the ordinate of the uppermost curve included in FIG. 2.

Responsive to the input pulses supplied by the clock source 30, the binary counter 20 sequentially translates through its 32 stable states with a period $\tau$, as shown by the solid line in the uppermost curve in FIG. 2. In addition, a broken-line graph is included in the uppermost curve of FIG. 2 to represent the binary complement of the instantaneous state of the counter 20. This curve will be employed hereinafter regarding the anti-coincidence detection process. However, it should be noted at this point that when the solid or broken-line curves attain a specific ordinate angular value, the stages A through E of the counter 20 are each equal or unequal, respectively, to the binary representation of the given angle. Therefore, under the above-described conditions, there is a coincidence and anti-coincidence, respectively, between the angular information supplied by the source 10, and the digits supplied by the counter 20. Moreover, by reason of the symmetry heretofore discussed regarding Table I, supra, it should be observed that the solid and dotted curves are symmetrical about the 180° points which correspond to the times $b$, $b'$ and $b''$ illustrated in the uppermost curve in FIG. 2.

Except for the specific counter states 01010 and 10101, selected ones (less than all) of the corresponding stages A through E of the source 10 and counter 20 will have a coincidence in operative states therebetween, while the remaining stages will be anti-coincident. For example, with the stages A through E of the counter 20 residing in the binary state 01110, there is a coincidence between the stages A, B, D and E of the source 10 and counter 20, while an anti-coincidence exists between the stages C. Responsive to such a counter state, the Exclusive OR gates 30, 31, 33 and 34 will have an energized inhibited output terminal, while the Exclusive OR gate 32 associated with the stages of the source 10 and counter 20 will have an energized uninhibited output terminal. With the gates 30 through 34 residing in the above-defined states, neither of the AND gates 70a or 70b is fully enabled and the sine flip-flop 80 remains in its initially reset condition. Hence, the flip-flop output terminal 83 resides in a relatively low voltage condition (zero volts) as shown in the second curve in FIG. 2 for the interval preceding time $a$.

However, each time the stages A through E of the counter 20 reside in the condition 01010, which occurs at the times $a$, $a'$ and $a''$ shown in the uppermost curve in FIG. 2, there is an exact correspondence between the conditions of the source 10 and counter 20. Responsive thereto, the inhibited output terminal of each of the Exclusive OR gates 30 through 34 is energized, and the AND gates 70a and 70b switch to relatively high operative states. The enabled gate 70b activates the set terminal 81 of the sine flip-flop 80 which then supplies a relatively high output potential ($+V$ volts) to the output terminal 83 thereof, as shown in the second curve in FIG. 2 for the intervals following the times $a$, $a'$ and $a''$. Note that these conditions occur when the solid curve in the upper curve in FIG. 2 attains the ordinate P representing the input angle.

As the counter 20 continues to sequentially translate through its operative conditions past the state 01010, there is neither a coincidence nor an anti-coincidence between the source 10 and counter 20. Thus, the AND gate 72 does not activate the flip-flop reset terminal 82, and the sine flip-flop 80 continues to reside in its relatively high state. However, at the times $c$, $c'$ and $c''$ shown in the uppermost curve in FIG. 2, the counter 20 attains the state 10101. In such a condition, as indicated by the broken-line curve in FIG. 2, representing the complement of the operative condition for the counter 20, there is an exact anti-coincidence between each of the stages included in the source 10 and its corresponding stage in the counter 20. Responsive thereto, the Exclusive OR gates 30 through 34 each energize the uninhibited output terminal thereof, thereby enabling the AND gates 72a and 72b. When the clock source 30 next supplies a pulse, the counter 20 changes state to reside in the condition 10110, thereby causing the D and E stages of the counter 20 and source 10 to be identical, while the stages A through C differ. Hence, the AND gates 72a and 72b are de-energized and, responsive thereto, the differentiator and inverter 98 energizes the reset flip-flop input terminal 82, hence resetting the flip-flop 80 to its relatively low voltage condition one counting interval following the times $c$, $c'$ and $c''$, as illustrated in the second curve in FIG. 2.

Examining the output potential appearing at the output terminal 83 of the sine flip-flop 80, which potential is shown in the second curve in FIG. 2, note that the leading and trailing edges of the three pulses shown therein are each symmetrically displaced about the times $b$, $b'$ and $b''$ each of which represents a 180° point. The output potential of the flip-flop 80 comprises symmetrical pulse-width-modulated signals, with the input angular information being embodied in the width of the symmetrical pulses. The differentiation and inversion circuit 98 is employed in the FIG. 1 arrangement to facilitate the above-described symmetry. More specifically, since the flip-flop set terminal 81 responds to the leading edge of the AND gate 70b output signal, the element 98 is utilized to render the flip-flop reset terminal 82 responsive to the trailing, rather than the leading edge, of the enabling energization supplied thereto by the enabled AND gate 72b.

Turning again to the flip-flop output potential illustrated in the second curve in FIG. 2, for convenience in analysis assume that a mathematical origin is placed at time $b$. The expression for the sine flip-flop 80 output potential $v_s(t)$ is given by:

$$v_s(t) = V \text{ for } |t| < \Delta$$
$$= O \text{ for } \Delta < |t| < \tau/2 \quad (1)$$

where $\Delta$ is the width of the symmetrical pulse between the origin and the leading or trailing edge of the pulse and $\tau$ is the period of one complete cycle for the counter 20, as mentioned hereinabove. The output voltage wave shape is mathematically even, and hence $v_s(t)$ may be shown by a Fourier analysis to be given by:

$$v_s(t) = \frac{2\Delta}{\tau}V + \sum_{n=1}^{\infty} A_n \cos \frac{2\pi n}{\tau}t$$

where (2)

$$A_n = \frac{2}{\tau} \int_{-\frac{\tau}{2}}^{+\frac{\tau}{2}} v_s(t) \cos \frac{2\pi n t}{\tau} dt$$

The Fourier expression given above comprises a direct-current term $$\frac{2\Delta}{\tau}V$$

plus an infinite series of cosine time-dependent sinusoids. As the filter 90 is designed to pass only the fundamental frequency ($1/\tau$) sinusoid, thereby eliminating the direct-current term and all sinusoidal harmonics, the fundamental frequency amplitude $A_1$ is of particular interest. The amplitude $A_1$ is given by:

$$A_1 = \frac{2}{\tau} \int_{-\Delta}^{+\Delta} V \cos \frac{2\pi t}{\tau} dt = \frac{2V}{\pi} \sin \frac{2\pi \Delta}{\tau} \quad (3)$$

Hench, the final potential $v_{so}(t)$ is supplied by the filter 90 to the output utilization means 95 is:

$$v_{so}(t) = \frac{2V}{\tau} \sin \frac{2T}{\tau}\Delta \cdot \cos \frac{2\pi}{\tau}t = (K \sin \omega\Delta)(\cos \omega t) \quad (4)$$

where $K$ equals $2V/\tau$ and $\omega$ equals $2\pi/\tau$. Thus, the output potential supplied to the output utilization means 95 is a sinusoid $\cos \omega t$ having an amplitude variation proportional to the sine of the term $\Delta$.

However, by referring to FIGS. 1 and 2, it is observed that $\Delta$ varies linearly with the magnitude of the input angle supplied by the input source 10. More specifically, as the input angle increases from 0 towards 180°, $\Delta$ linearly decreases from $\pi/2$ to 0. By referring to Table II infra, it is apparent that the amplitude term $$\sin \frac{2\pi}{\tau}\Delta$$

of the output sinusoid $v_{so}(t)$ varies as the sine of the input angle supplied by the input source 10:

TABLE II

| Selected Input Angles | Corresponding $\Delta$ | Sinusoidal Magnitude Variation $\sin 2\pi\Delta$ |
|---|---|---|
| 0 | $\tau/2$ | 0 |
| 45° | $3\tau/8$ | .707 |
| 90° | $\tau/4$ | 1 |
| 135° | $\tau/8$ | .707 |
| 180° | 0 | 0 |

Hence, as indicated by the first and third columns in Table II above, it is manifest that the amplitudes of the sinusoid supplied by the filter 90 to the output means 95 is a sine function of the input angle for angles ranging between 0° and 180°.

As the input angle increases to the range between 180° and 360°, note that the Exclusive OR gates 30 through 34 detect an anti-coincidence between the source 10 and counter 20 before they detect a coincidence therebetween. Hence, there is a polarity inversion of the resulting flip-flop 80 output potential, with the flip-flop 90 normally residing in a relatively high potential state, and residing in a relatively low potential state between the times when there is an anti-coincidence and a coincidence, respectively, between the source 10 and counter 20. However, an analysis of such an output wave shape for angles in the 180°–360° range, similar to that given above for input angles in the range between 0° and 180°, yields the negative of expression (4), supra. This, of course, is the expected result since sine $(\theta+180°)=$ $\sin \theta$. Hence, the FIG. 1 arrangement has been shown by the above to generate an output sinusoidal signal $v_{so}(t)$ having an amplitude proportional to the sine of the input angle for the complete range 0° through 360°.

In FIG. 1 arrangement also generates an output sinusoid having an amplitude proportional to the cosine of the input angle. Fundamentally, the cosine generating portion of the FIG. 1 arrangement is conceptually similar to that described above for the sine, with the cosine being generated by the simple identity:

$$\cos \theta = \sin (\theta+90°) \quad (5)$$

That is, 90° will simply be added to the angular data supplied by the input source 10, and the resulting, modified input information will be operated upon precisely as was the initial input data supplied by the source 10 in generating the sine function.

To add 90° to the input angular digital word, a "1" is simply added to the B stage of the source 10, which is weighted to represent 90°. If a "1" already existed in this stage, the result is a "0" for the B stage and a "1" is carried into the A or 180°-weighted stage and added thereto. This function is performed by the 90° adder 97 which is supplied with the output signals from the A and B stages of the source 10. In turn, the adder 97 supplies modified angular data, symbolized in FIG. 1 as the output signals from the portions A' and B' of the adder 97, to the exclusive OR gates 38 and 39. It is noted from the above discussion, that the 90° adder 97 may advantageously comprise any two-stage serial adder well known in the art.

The modified angular digital information supplied by the 90° adder 97, together with the C, D and E stage digits originally supplied by the source 10, represent an angle 90° greater than the original input angle. This modified angle information is then processed as were the original digits A through E discussed above with respect to the generation of the sine function. Specifically, the Exclusive OR gates 32 through 34 detect a coincidence or an anti-coincidence between the outputs of the stages C through E of the counter 20 and source 10 and respectively enable the AND gates 70a and 72a. Moreover, the Exclusive OR gates 38 and 39 detect a coincidence or anti-coincidence between the outputs of the stages A and B of the counter 20 and the modified angle information supplied by the adder 97. The output information from the logic gates 38, 39 and 70a is supplied to the AND gate 75, while the output signals from the gates 38, 39 and 72a are supplied to the AND gate 77. This is identically parallel to the operation involving the AND gates 70b and 72b discussed hereinabove with respect to the sine function.

The gates 75 and 77 respectively supply output signals to the set and reset input terminals 86 and 87 of the cosine flip-flop 85. The output terminal 88 of the cosine flip-flop 85 thus has a symmetrical pulse-width-modulated output wave shape similar to that shown in the second curve in FIG. 2 representing the output of the flip-flop 80, except that the widths of the pulses included therein reflect the fact that the angle is 90° larger. The filter 91 then transmits a voltage $v_{co}(t)$ to the output utilization means 95, given by:

$$v_{co}(t) = \frac{2V}{\tau} \cos \frac{2\pi}{\tau}\Delta \cos \frac{2\pi}{\tau}t = K \cos \omega\Delta \cdot \cos \omega t \quad (6)$$

where K and $\omega$ have been previously defined. Hence, the FIG. 1 arrangement develops two sinusoids, $\cos \omega t$, which are respectively characterized by amplitude variations dependent upon the sine and cosine of an input angle supplied by the input source 10.

The resulting output signals denoted by Equations 4 and 6 may be employed in a variety of circuit applications, as described hereinabove. For example, these signals may be supplied to orthogonal windings included on a synchro or a resolver to position an antenna or other shaft. Moreover, either or both of these signals may be rectified, thereby yielding an analog direct-current signal having an amplitude proportional to the sine or cosine of the input angle. Such a circuit embodiment may advantageously be employed in an analog computer to generate the respective trigonometric function.

Summarizing the basic concepts of an illustrative embodiment of the present invention, a circuit arrangement is provided for converting angular information in digital form into constant frequency alternating current signals having maximum amplitudes proportional to the sine and cosine of the input angle. The converter portion for generating each of the sine and cosine functions includes coincidence and anti-coincidence logic arrangements to compare the input angle digital information with the state of a linearly time-varying binary counter. The two logic circuit output signals are supplied to the set and reset input terminals of a flip-flop, with the resulting flip-flop output wave shape comprising pulse-width-modulated signals symmetrically displaced about periodically recurring reference times.

The flip-flop output potential is passed through a band-pass filter which transmits only the fundamental frequency sinusoid therethrough. A Fourier analysis shows that this sinusoidal signal is characterized by an amplitude proportional to the corresponding trigonometric function of the input angle.

It is to be understood that the above-described arrangements are only illustrative of the application of the present invention. Numerous other arrangements may be devised by those skilled in the art without departing from the spirit and scope of the present invention. For example, while the FIG. 1 embodiment was disposed to receive input angular information in digital form, an analog signal might well have been employed. In such an arrangement, the input source 10 would supply angular information represented by the magnitude of an input potential, and the binary counter 20 would be replaced by a linear sawtooth voltage generator. In addition, the Exclusive OR gates 30 through 34, 38 and 39 would be replaced by analog level detectors.

Also, while the counter 20 and input source 10 are each shown as illustratively comprising five stages, any number of stages might well have been employed depending upon the accuracy desired for the FIG. 1 embodiment. In general terms, if $n$ stages are employed, the 360° arc would be quantized into $360/2^n$ degree segments.

What is claimed is:

1. In combination, a digital source of angular information, a binary counter, means for sequentially varying the state of said counter, logic means connected to said digital source and to said counter for detecting a coincidence and an anti-coincidence between the representations thereof, a flip-flop connected to said logic means for residing in first and second stable states when said logic means has last detected a coincidence and an anti-coincidence, respectively, between the representations of said digital source and said counter, said flip-flop thereby producing a symmetrical pulse-width-modulated output potential, and filter means connected to said flip-flop for transmitting therethrough only the fundamental frequency sinusoid included in said flip-flop output potential.

2. A combination as in claim 1, wherein said logic means comprises a plurality of Exclusive OR logic gates each including inhibited and uninhibited output terminals.

3. A combination as in claim 2, wherein said counter-varying means comprises a clock source connected to said binary counter.

4. In combination, an $n$-stage source of angular information for supplying $n$ binary digits, where $n$ is any positive integer, a binary counter including $n$ stages, $n$ Exclusive OR gates each comprising a plurality of input terminals, an inhibited output terminal and an uninhibited output terminal, said input terminals included in each of said Exclusive OR gates being connected to a different stage of said input source and a different stage of said counter, first and second AND logic gates each comprising a plurality of input terminals and an output terminal, and a flip-flop including a set input terminal connected to the output terminal of said first AND gate and a reset terminal connected to the output terminal of said second AND gate, said input terminals of said first and second AND gates being respectively connected to said inhibited and said uninhibited output terminals of said Exclusive OR gates.

5. A combination as in claim 4, further comprising a clock source connected to said binary counter, and a bandpass filter connected to said flip-flop.

6. In combination, a digital source of angular information; means connected to said source for adding 90° to each angle representation supplied by said source; a binary counter; first logic means connected to said digital source and to said counter for detecting a coincidence and an anti-coincidence between the representations thereof; a first flip-flop connected to said first logic means for residing in first and second stable states when said first logic means has last detected a coincidence and an anti-coincidence, respectively, between said digital source and said counter; second logic means connected to said digital source, said 90° adder and said counter for detecting a coincidence and an anti-coincidence between the information supplied by said input source and said 90° adder, and the digital state of said counter; a second flip-flop connected to said second logic means for residing in first and second stable states when said second logic means has last detected a coincidence and an anti-coincidence, respectively, between the representations of said counter, and said input source and said 90° adder.

7. A combination as in claim 6, further comprising first and second bandpass filters respectively connected to said first and second flip-flops.

8. A combination as in claim 7, further including an output utilization means connected to said first and second bandpass filters.

9. In combination, a source of angular information signals, means for supplying recurring signals varying linearly with time, logic means connected to said source and to said linear time-varying means for detecting a coincidence and an anti-coincidence between the signals therefrom, a bistable element connected to said logic means for residing in first and second stable states when said logic means has last detected a coincidence and anti-coincidence, respectively, between the signals from said source and said time-varying means, and bandpass filter means connected to said bistable means.

10. In combination, a source of angular input information signals, means for supplying signals varying linearly with time, logic means for detecting a coincidence and a direct anti-coincidence between each entire signal representation from said time-varying means and the entire signal representations from said input source, and bistable means connected to said logic means for producing symmetrical pulse-width-modulated signals.

11. In combination, a digital source of angular information, a binary counter, means for sequentially varying the state of said counter, means connected to said source for adding 90° to the information supplied by said source, and logic means connected to said source, counter and 90° adding means to detect a coincidence and an anti-coincidence between the information supplied by said counter and the information supplied by said adder and said source.

12. A combination as in claim 11, further including bistable means connected to said logic means for residing in first and second stable states when said logic means has last detected a coincidence and an anti-coincidence, respectively, between the representations of said source and said adder, and said counter, said bistable means thereby generating symmetrical pulse-width-modulated output signals.

13. A combination as in claim 12, further including a bandpass filter connected to said bistable means.

14. A combination as in claim 13, further comprising an output utilization means connected to said filter.

15. In combination, a source of angular input information signals, means for supplying signals varying linearly with time, logic means for detecting a coincidence and a direct anti-coincidence between each entire signal representation from said time-varying means and the entire signal representations from said input source, bistable means connected to said logic means for producing symmetrical pulse-width-modulated signals, and filter means connected to said signal-producing means for passing only a fundamental frequency sinusoid therethrough.

16. In combination, in a symmetrical pulse-width modulator, a digital source of input information, a binary counter, logic means connected to said source and said counter for detecting a coincidence and a direct anti-coincidence between the components of each entire digital input representation and the components of the counter representations, and bistable means connected to said logic means for residing in first and second stable states when said logic means has last detected a coincidence and an anti-coincidence, respectively, between said counter and said digital source.

17. In combination in a symmetrical pulse width modulator,
   a digital source of input information,
   a binary counter,
   logic means connected to said source and said counter for detecting a coincidence and a direct anti-coincidence between the components of each entire digital input representation and the components of the counter representations, said logic means comprising:
      a plurality of exclusive OR gates each including a plurality of input terminals selectively connected to said digital source and to said counter, an uninhibited output terminal and an inhibited output terminal, and
      first and second AND gates each having a plurality of input terminals respectively connected to said inhibited and said uninhibited exclusive OR gate output terminals, said AND gates each further including an output terminal connected to said bistable means, and
   bistable means connected to said logic means for residing in first and second stable states when said logic means has last detected a coincidence and an anti-coincidence, respectively, between said counter and said digital source.

18. A combination as in claim 17 further including a clock pulse source connected to said counter.

References Cited
UNITED STATES PATENTS

| | | | |
|---|---|---|---|
| 2,907,021 | 9/1959 | Woods | 340—347 |
| 3,221,326 | 11/1965 | Lawhon | 340—347 |
| 3,254,337 | 5/1966 | Hunt | 340—347 |

DARYL W. COOK, *Acting Primary Examiner.*

MAYNARD R. WILBUR, *Examiner.*

W. J. KOPACZ, *Assistant Examiner.*